(12) United States Patent
Cassidy (10) Patent No.: US 11,038,945 B2
(45) Date of Patent: Jun. 15, 2021

(54) INTERFACING WITH REMOTE CONTENT MANAGEMENT SYSTEMS

(71) Applicant: SHINYDOCS CORPORATION, Waterloo (CA)

(72) Inventor: Jason William David Cassidy, Kitchener (CA)

(73) Assignee: ShinyDocs, Waterloo (CA)

( * ) Notice: Subject to any disclaimer, the term of this patent is extended or adjusted under 35 U.S.C. 154(b) by 767 days.

(21) Appl. No.: 14/458,667

(22) Filed: Aug. 13, 2014

(65) Prior Publication Data
US 2016/0050257 A1 Feb. 18, 2016

(51) Int. Cl.
*G06F 15/167* (2006.01)
*H04L 29/08* (2006.01)
*G06F 16/188* (2019.01)
*G06F 3/06* (2006.01)

(52) U.S. Cl.
CPC .............. *H04L 67/06* (2013.01); *G06F 3/067* (2013.01); *G06F 16/196* (2019.01); *H04L 67/1097* (2013.01)

(58) Field of Classification Search
CPC ... H04L 67/06; H04L 67/1097; H04L 67/125; G06F 17/30238; G06F 3/067; G06F 17/30067; G06F 17/30091; G06F 17/30233; G06F 17/30082; G06F 17/30126; G06F 16/196; G06F 16/122
USPC ....... 709/203, 213, 216, 217, 219, 223, 225, 709/229; 707/827
See application file for complete search history.

(56) References Cited

U.S. PATENT DOCUMENTS

| | | | | |
|---|---|---|---|---|
| 6,356,915 B1* | 3/2002 | Chtchetkine | ...... | G06F 17/30235 707/823 |
| 2001/0014892 A1* | 8/2001 | Gaither | ............. | G06F 17/30235 |
| 2003/0097454 A1* | 5/2003 | Yamakawa | ....... | H04L 29/12018 709/229 |
| 2003/0191743 A1* | 10/2003 | Brodersen | ......... | G06F 17/30174 |
| 2005/0060316 A1* | 3/2005 | Kamath | ............ | G06F 17/30067 |
| 2005/0289218 A1* | 12/2005 | Rothman | .............. | G06F 3/0605 709/203 |
| 2006/0122955 A1* | 6/2006 | Bethlehem | ............ | H04L 63/102 |
| 2007/0220014 A1* | 9/2007 | Emling | ............. | G06F 17/30126 |
| 2010/0191785 A1* | 7/2010 | Serlet | ................ | G06F 17/30067 707/827 |
| 2014/0081933 A1* | 3/2014 | Uhrhane | ............. | G06F 17/3023 707/695 |
| 2015/0199414 A1* | 7/2015 | Braginsky | ......... | G06F 17/30132 707/613 |
| 2016/0019317 A1* | 1/2016 | Pawar | ................. | G06F 17/3007 707/649 |
| 2016/0028796 A1* | 1/2016 | Garcia | ................. | G06F 3/0482 715/738 |

(Continued)

*Primary Examiner* — Johnny B Aguiar (57) ABSTRACT

A content management system interface at a local computer device is configured to receive user file commands from a file manager and translate the user file commands into content management commands for sending to the remote content management system via a network interface. The content management system interface can further be configured to receive remote file information from the remote content management system via the network interface and translate the remote file information into user file information for the file manager.

17 Claims, 7 Drawing Sheets

(56) References Cited

U.S. PATENT DOCUMENTS

2016/0028811 A1\* 1/2016 Rashid ............... H04L 67/1095
715/738

\* cited by examiner

INTERFACING WITH REMOTE CONTENT MANAGEMENT SYSTEMS

FIELD

This disclosure relates to computer systems and, more specifically, to remote file storage and access.

BACKGROUND

Content management systems are often used to store files and other data for access by users of an organization's computers.

Some kinds of content management system provide customized interfaces, such as web-based interfaces. Web browsers are used to interact with stored files. One problem with this approach is that users are not necessarily familiar with such interfaces and can be resistant to learning such. This can cause the content management system to become underutilized, as it is often the case that users prefer the file interface native to the computer operating system with which they are familiar.

Other types of content management system provide an interface that appears and behaves like a native file interface. However, these systems often suffer from other drawbacks. In some cases, the file interface mimics the native interface, but is not similar enough for users to accept. Some of such systems are based on synchronizing local copies of a file with a remote copy stored at the content management system. Systems relying on synchronization can have poor performance and may not support functionality available at the content management system and the native file interface.

Another drawback of content management systems is the need to migrate files from legacy storage. This can be time consuming and can demand a large amount of effort.

SUMMARY

According to one aspect of the present invention, a content management system interface at a local computer device is configured to receive user file commands from a file manager and translate the user file commands into content management commands for sending to the remote content management system via a network interface. The content management system interface can further be configured to receive remote file information from the remote content management system via the network interface and translate the remote file information into user file information for the file manager.

BRIEF DESCRIPTION OF THE DRAWINGS

The drawings illustrate, by way of example only, embodiments of the present disclosure.

DETAILED DESCRIPTION

This disclosure concerns exposing a remote content management system to a local user's computer as a local or shared drive. Rather than simply mimicking the look and feel of a local/shared drive, the operating system (OS) and user are presented with a local/shared drive that is controlled by an interface at or below the level of the file system driver. The remote content management system thus appears substantially identical to a local/shared drive, which places little to no learning curve on users. The system intelligently handles temporary files and file permissions. The system also allows for smooth migration from legacy storage to content management system. Other features and advantages of the system will be apparent from the following description.

Figure 1:
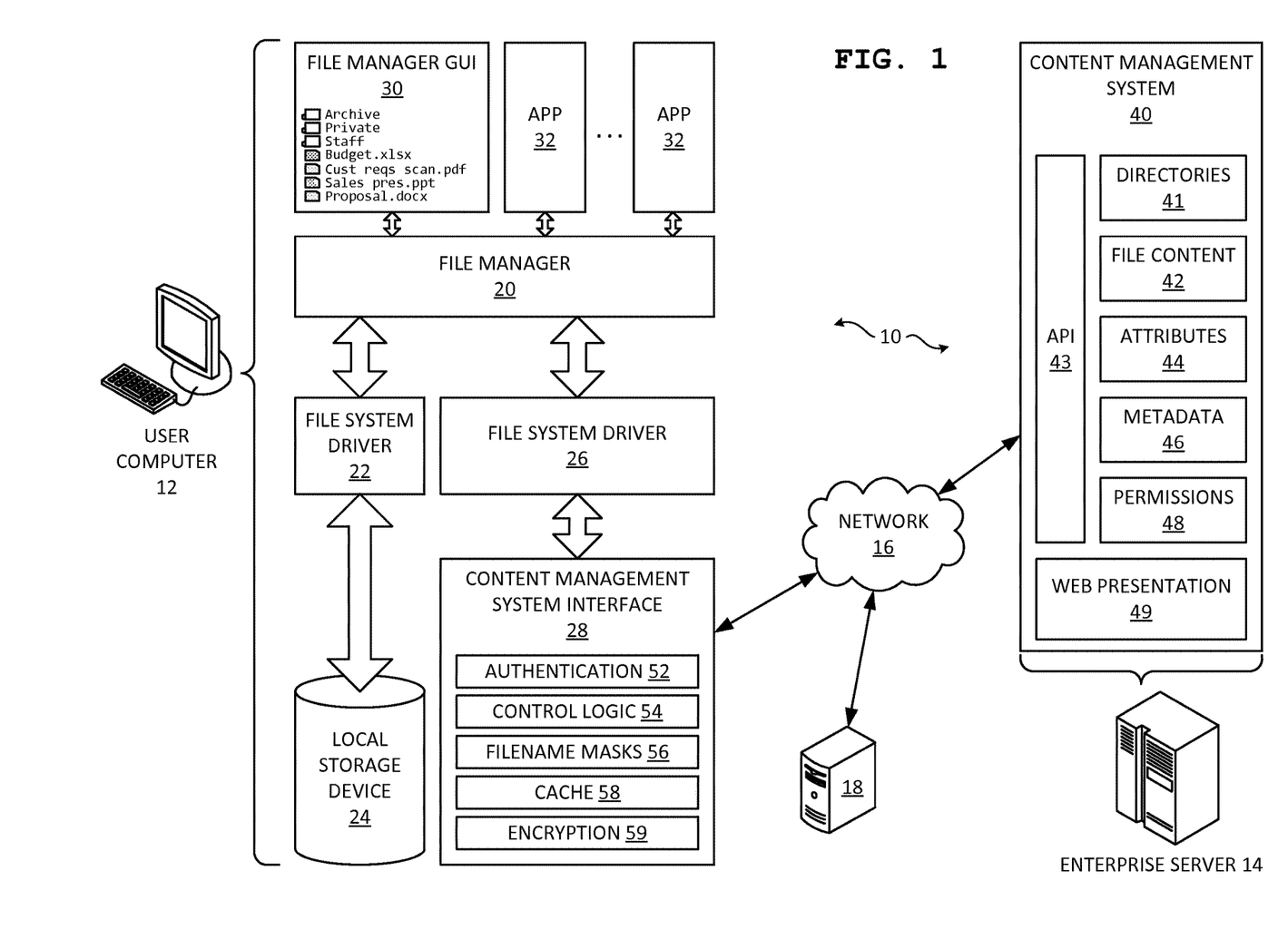
FIG. 1 is a block diagram of a networked computer system.

FIG. 1 shows a networked computer system 10 according to the present invention. The system 10 includes at least one user computer device 12 and at least one server 14 connected by a network 16.

The user computer device 12 can be a device such as a desktop or notebook computer, a smartphone, tablet computer, and the like. The user computer device 12 may be referred to as a computer.

The server 14 is a device such as a mainframe computer, blade server, rack server, cloud server, or the like. The server 14 may be operated by a company, government, or other organization and may be referred to as an enterprise server or an enterprise content management (ECM) system.

The network 16 can include any combination of wired and/or wireless networks, such as a private network, a public network, the Internet, an intranet, a mobile operator's network, a local-area network, a virtual-private network (VPN), and similar. The network 16 operates to communicatively couple the computer device 12 and the server 14.

In a contemplated implementation, a multitude of computer devices 12 connect to several servers 14 via an organization's internal network 16. In such a scenario, the servers 14 store documents and other content in a manner that allows collaboration between users of the computer devices 12, while controlling access to and retention of the content. Such an implementation allows large, and often geographically diverse, organizations function. Document versioning or/and retention may be required by some organizations to meet legal or other requirements.

The system 10 may further include one or more support servers 18 connected to the network 16 to provide support services to the user computer device 12. Examples of support services include storage of configuration files, authentication, and similar. The support server 18 can be within a domain controlled by the organization that controls the servers 14 or it can be controlled by a different entity.

The computer device 12 executes a file manager 20, a local-storage file system driver 22, a local storage device 24, a remote-storage file system driver 26, and a content management system interface 28.

The file manager 20 is configured for receiving user file commands from a user interface (e.g., mouse, keyboard, touch screen, etc.) and outputting user file information via the user interface (e.g., display). The file manager 20 may include a graphical user interface (GUI) 30 to allow a user of the computer 12 to navigate and manipulate hierarchies of folders and files, such as those residing on the local storage device 24. Examples of such include Windows Explorer and Mac OS Finder. The file manager 20 may further include an application programming interface (API) exposed to one or more applications 32 executed on the computer 12 to allow such applications 32 to issue commands to read and write files and folders. Generally, user file commands include any user action (e.g., user saves a document) or automatic action (e.g., application's auto-save feature) performed via the file manager GUI 30 or application 32 that results in access to a file. The file manager GUI 30 and API may be provided by separate programs or processes. For the purposes of this disclosure, the file manager 20 can be considered to be one or more processes and/or programs that provide one or both of the file manager GUI 30 and the API.

The local-storage file system driver 22 is resident on the computer 12 and provides for access to the local storage device. The file system driver 22 responds to user file commands, such as create, open, read, write, and close, to perform such actions on files and folders stored on the local storage device 24. The file system driver 22 may further provide information about files and folders stored on the local storage device 24 in response to requests for such information.

The local storage device 24 can include one or more devices such as magnetic hard disk drive, optical drives, solid-state memory (e.g., flash memory), and similar.

The remote-storage file system driver 26 is coupled to the file manager 20 and is further coupled to the content management system interface 28. The file system driver 26 maps the content management system interface 28 as a local drive for access by the file manager 20. For example, the file system driver 26 may assign a drive letter (e.g., "H:") or mount point (e.g., "\Enterprise") to the content management system interface 28. The file system driver 26 is configured to receive user file commands from the file manager 20 and output user file information to the file manager 20. Examples of user file commands include create, open, read, write, and close, and examples of file information include file content, attributes, metadata, and permissions.

The remote-storage file system driver 26 can be based on a user-mode file system driver.

The remote-storage file system driver 26 can be configured to delegate callback commands to the content management system interface 28. The callback commands can include file system commands such as Open, Close, Cleanup, CreateDirectory, OpenDirectory, Read, Write, Flush, GetFileInformation, GetAttributes, FindFiles, SetEndOfFile, SetAttributes, GetFileTime, SetFileTime, LockFile, UnLockFile, GetDiskFreeSpace, GetFileSecurity, and SetFileSecurity.

The content management system interface 28 is the interface between the computer 12 and the enterprise server 14. The content management system interface 28 connects, via the network 16, to a content management system 40 hosted on the enterprise server 14. As will be discussed below, the content management system interface 28 can be configured to translate user commands received from the driver 26 into content management commands for the remote content management system 40.

The content management system interface 28 is a user-mode application that is configured to receive user file commands from the file manager 20, via the driver 26, and translate the user file commands into content management commands for sending to the remote content management system 40. The content management system interface 28 is further configured to receive remote file information from the remote content management system 40 and to translate the remote file information into user file information for providing to the file manager 20 via the driver 26.

The remote content management system 40 can be configured to expose an API 43 to the content management system interface 28 in order to exchange commands, content, and other information with the content management system interface 28. The remote content management system 40 stores directory structures 41 containing files in the form of file content 42, attributes 44, metadata 46, and permissions 48. File content 42 may include information according to one or more file formats (e.g., ".docx", ".txt", ".dxf", etc.), executable instructions (e.g., an ".exe" file), or similar. File attributes 44 can include settings such as hidden, read-only, and similar. Metadata 46 can include information such as author, date created, date modified, tags, file size, and similar. Permissions 48 can associate user or group identities to specific commands permitted (or restricted) for specific files, such as read, write, delete, and similar.

The remote content management system 40 can further include a web presentation module 49 configured to output one or more web pages for accessing and modifying directory structures 41, file content 42, attributes 44, metadata 46, and permissions 48. Such web pages may be accessible using a computer's web browser via the network 16. The web presentation module 49 can be a problematic interface and is not discussed further here.

The content management system interface 28 provides functionality that can be implemented as one or more programs or other executable elements. The functionality will be described in terms of distinct elements, but this is not to be taken as limiting. In specific implementations not all of the functionality need be implemented.

The content management system interface 28 includes an authentication component 52 that is configured to prompt a user to provide credentials for access to the content management system interface 28 and for access to the remote content management system 40. Authentication may be implemented as a username and password combination, a certificate, or similar, and may include querying the enterprise server 14 or the support server 18. Once the user of the computer device 12 is authenticated, he or she may access the other functionality of the content management system interface 28.

The content management system interface 28 includes control logic 54 configured to transfer file content between the computer 12 and the server 14, apply filename masks, evaluate file permissions and restrict access to files, modify file attributes and metadata, and control the general operation of the content management system interface 28. The control logic 54 further effects mapping of remote paths located at the remote content management system 40 to local paths presentable at the file manager 20. Path mapping permits the user to select a file via the final manager 20 and have file information and/or content delivered from the remote content management system 40. In one example, the remote files and directories are based on a root path of "hostname/directory/subdirectory" that is mapped to a local drive letter or mount point and directory (e.g., "H:/hostname/directory/subdirectory").

The content management system interface 28 includes filename masks 56 that discriminate between files that are to remain local to the computer 12 and files that are to be transferred to the remote content management system 40. Temporary files may remain local, while master files that are based on such temporary files may be sent to the remote content management system 40. This advantageously prevents the transmission of temporary files to the remote content management system 40, thereby saving network bandwidth and avoiding data integrity issues (e.g., uncertainty and clutter) at the remote content management system 40.

The content management system interface 28 includes a cache 58 of temporary files, which may include working versions of files undergoing editing at the user computer device 12 or temporary files generated during a save or other operating of an application 32.

The content management system interface 28 includes an encryption engine 59 configured to encrypt at least the cache 58. The encryption engine 59 can be controlled by the authentication component 52, such that a log-out or time out triggers encryption of the cache 58 and successful authentication triggers decryption of the cache 58. Other informational components of the content management system interface 28 may be encrypted as well, such as the filename masks 56. The encryption engine 59 may conform to an Advanced Encryption Standard (AES) or similar.

Figure 2:
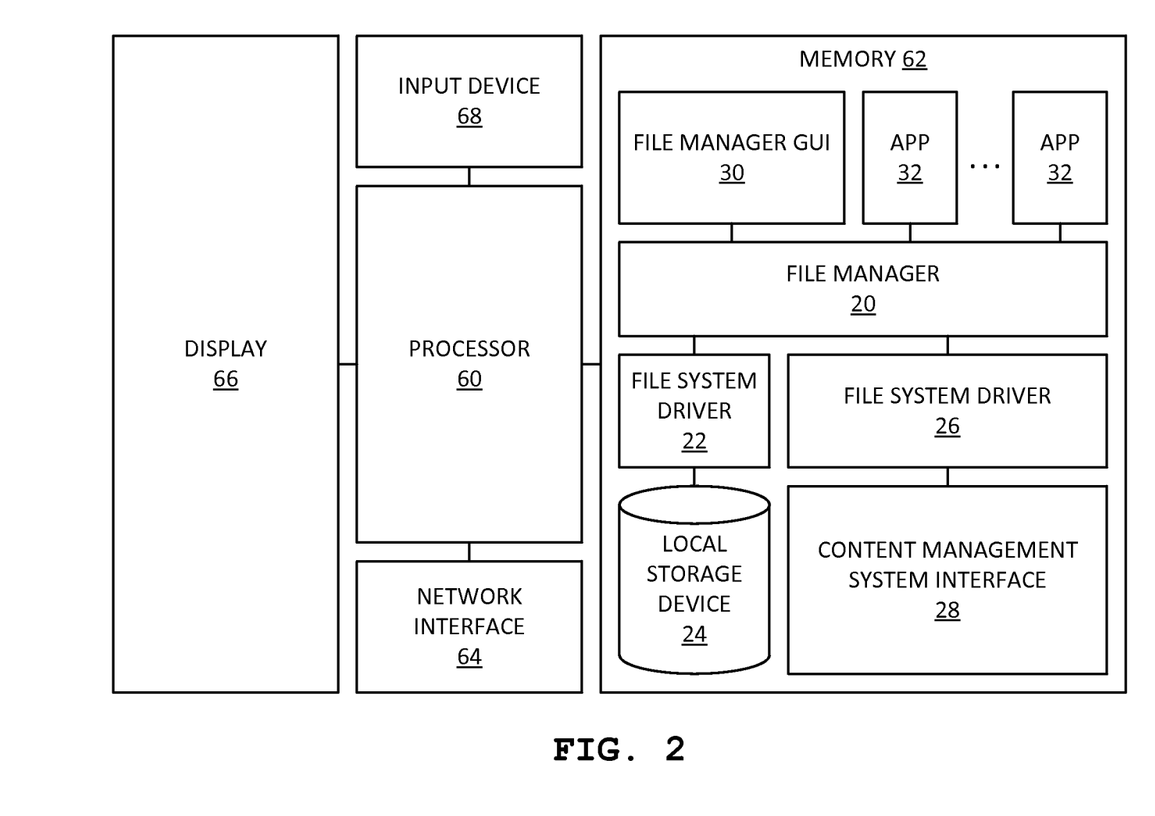
FIG. 2 is a block diagram of a user computer device.

FIG. 2 shows an example of a user computer device 12. The computer device 12 includes a processor 60, memory 62, a network interface 64, a display 66, and an input device 68. The processor 60, memory 62, network interface 64, display 66, and input device 68 are electrically interconnected and can be physically contained within a housing or frame.

The processor 60 is configured to execute instructions, which may originate from the memory 62 or the network interface 64. The processor 60 may be known a CPU. The processor 60 can include one or more processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the client computer (e.g., fixed hard drives) as well as removable components (e.g., removable memory cards). The memory 62 allows for random access, in that programs and data may be both read and written.

The network interface 64 is configured to allow the user computer device 12 to communicate with the network 16 (FIG. 1). The network interface 64 can include one or more of a wired and wireless network adaptor and well as a software or firmware driver for controlling such adaptor.

The display 66 and input device 68 form a user interface that may collectively include a monitor, a screen, a keyboard, keypad, mouse, touch-sensitive element of a touch-screen display, or similar device.

The memory 62 stores the file manager 20, the file system driver 26, and the content management system interface 28, as well as other components discussed with respect to FIG. 1. Various components or portions thereof may be stored remotely, such as at a server. However, for purposes of this description, the various components are locally stored at the computer device 12. Specifically, it may be advantageous to store and execute the file manager 20, the file system driver 26, and the content management system interface 28 at the user computer device 12, in that a user may work offline when not connected to the network 16. In addition, reduced latency may be achieved. Moreover, the user may benefit from the familiar user experience of the local file manager 20, as opposed to a remote interface or an interface that attempts to mimic a file manager.

Figure 3:
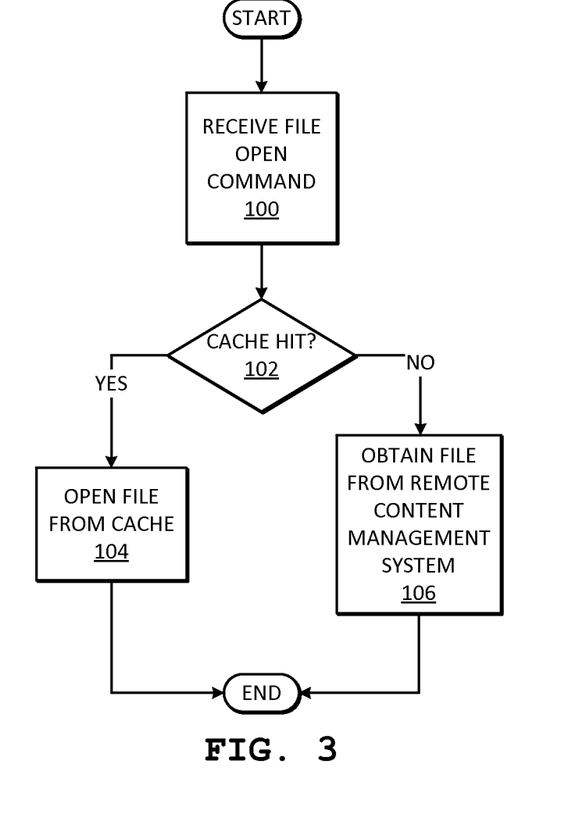
FIG. 3 is a flowchart of accessing a file.

FIG. 3 shows a process of a user computer device opening a file stored at a remote content management system. The process is described in terms of the system of FIG. 1, but this is not to be taken as limiting. The process can be used with other systems. In addition, although a procedure of discrete steps is discussed, this is for illustrative purposes. The process may be implemented as a procedure of fewer or more steps, as an object-oriented program, or according to other methodologies.

At step 100, a user command to open a file is received. For example, the file manager 20 may receive a command from an application 32 to open a file or the file manager 20 may receive a command to open a file that a user selects from a displayed folder of the GUI 30.

At step 102, it is determined whether the file to be opened can be obtained from local cache, such as cache 58 of the content management system interface 28. This can include sending a request to the remote content management system 40 to obtain unique file information, such as a last modified date, a hash, or similar, and comparing such information to similar information for the version of the file present in the cache. Checking the cache can additionally or alternatively include automatically determining a cache miss if a predetermined time has elapsed since the file was saved in cache (i.e., the locally cached version of the file is stale). Alternatively, a cache hit may be automatically decided if a predetermined time since the file was cached has not yet elapsed (i.e., the locally cached version of the file is fresh). Other techniques can be used to further reduce the number of requests to the remote content management system 40, while ensuring that the version of the file stored at the remote content management system 40 governs.

If the most recent version of the file is determined to exist in cache, then the file is opened from cache, at step 104.

If the file cannot be obtained from cache, then the file is obtained from the remote content management system 40 via requests through the network 16.

Figure 4:
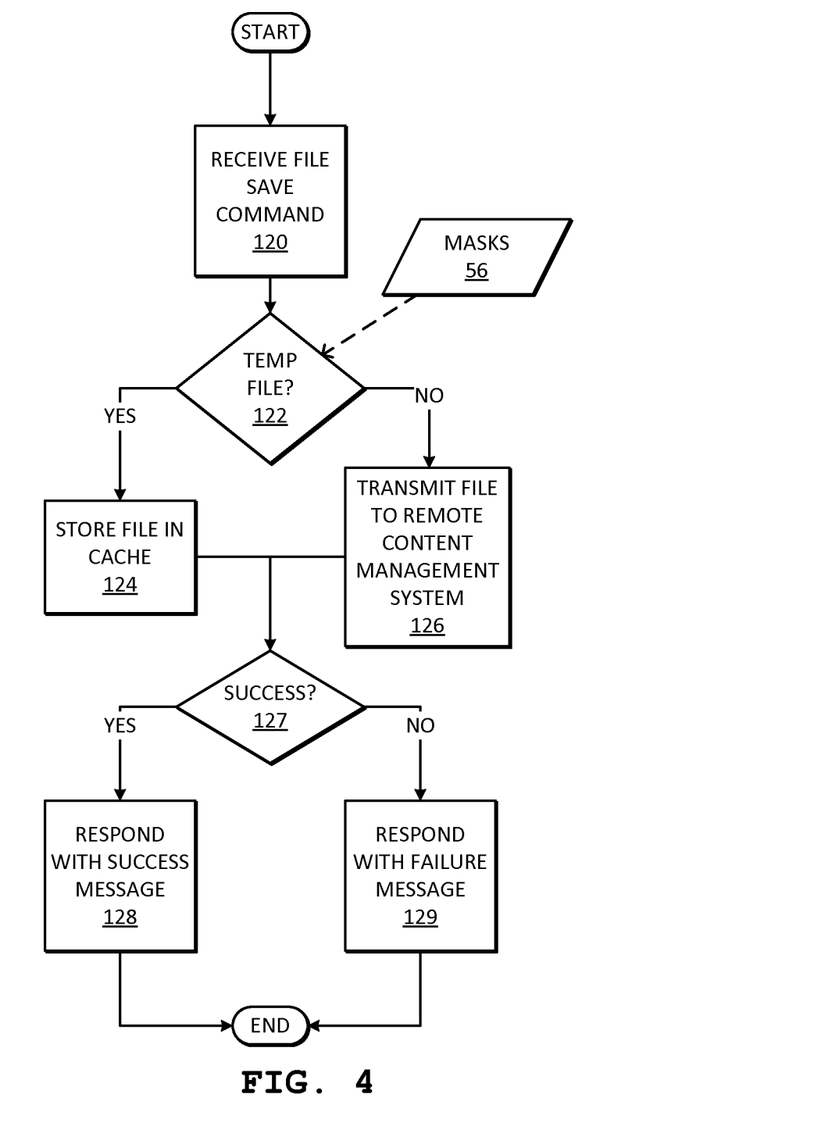
FIG. 4 is a flowchart of saving a file.

FIG. 4 shows a process of a user computer device saving a file to a remote content management system. The process is described in terms of the system of FIG. 1, but this is not to be taken as limiting. The process can be used with other systems. In addition, although a procedure of discrete steps is discussed, this is for illustrative purposes. The process may be implemented as a procedure of fewer or more steps, as an object-oriented program, or according to other methodologies.

At step 120, a user command to save a file is received. For example, the file manager 20 may receive a command from an application 32 to save a file, which may occur during editing or after a user has completing editing the file.

At step 122, it is determined whether the file to be saved is a temporary file. The filename masks 56 of the content management system interface 28 can be used for to make this determination. For example, if the file name of the file to be saved matches any of the masks 56, then the file is determined to be a temporary file. Temporary files may be generated by an application 32 performing a user-initiated or auto-save function in the process of generating a master file, which is the file that is the desired end result of the save function. One, several, or a multitude of temporary files may be generated and deleted when saving a file. However, only the master file is generally of concern to the user. Hence, at step 122, if the file is determined to be a temporary file, then the file is locally cached, at step 124, and is not sent to the content management system interface 28. Thus, by blocking the sending of such temporary files to the remote content management system 40, the amount of files or versions of files and the amount of overall data transferred via the network 16 can be reduced. Unnecessary clutter at the remote content management system 40 is also reduced.

If the file is determined to not be a temporary file, as defined by the masks 56, then, at step 126, the file is considered to be a master file and is transmitted to the remote content management system 40, via the network 16. The remote content management system 40 then receives the file and stores it as a new file or a version of an existing file.

The success of storing the file to local cache or the remote content management system 40 is evaluated at step 127. The content management system interface 28 is configured to generate a message indicating successful storage at the cache 58, or a failure message if caching fails. The content management system interface 28 is configured to receive a success or failure message from the remote content management system 40 when the file is a master file that is sent to the remote content management system 40.

Upon success, at step 128, the content management system interface 28 responds to the file manager 20 with the success message, whether such message originates from the content management system interface 28 or the remote content management system 40. The file manager 20 may indicate to the application 32, or directly to the user via the GUI 30, that the file was successfully saved.

Upon failure, at step 129, the content management system interface 28 responds to the file manager 20 with the failure message, whether such message originates from the content management system interface 28 or the remote content management system 40. The file manager 20 may indicate to the application 32, or directly to the user via the GUI 30, that the file was not saved.

The process shown in FIG. 4 is repeated for each file that is to be saved. It is contemplated that saving a master file may include saving, combining, and subsequently deleting, several temporary files. In such case, the process repeats via local-caching step 124 until the master file is detected, at which time the process proceeds with step 126 to send the master file, and only the master file, to the remote content management system 40.

Temporary files can be forbidden from inclusion in the remote content management system 40, and this can be controlled by pattern matching. An example of a temporary filename is ~$filename.docx where the defining pattern is the tilde (~) at the beginning of the filename. Using a regular expression

FORBIDDEN=^~.*$ can be used to disallow all files that begin with the tilde character from inclusion in the remote content management system 40.

A specific allowed list can use patterns that restrict all documents except those that match the allowed pattern. An example is ALLOWED=^.*(\\.docx)$|^.*(\\.xlsx)$ which explicitly allows master files with extensions of either "docx" or "xlsx". Allowed and forbidden lists can be combined to ensure only master files of specific masks will be added to the remote content management system 40.

Figure 5:
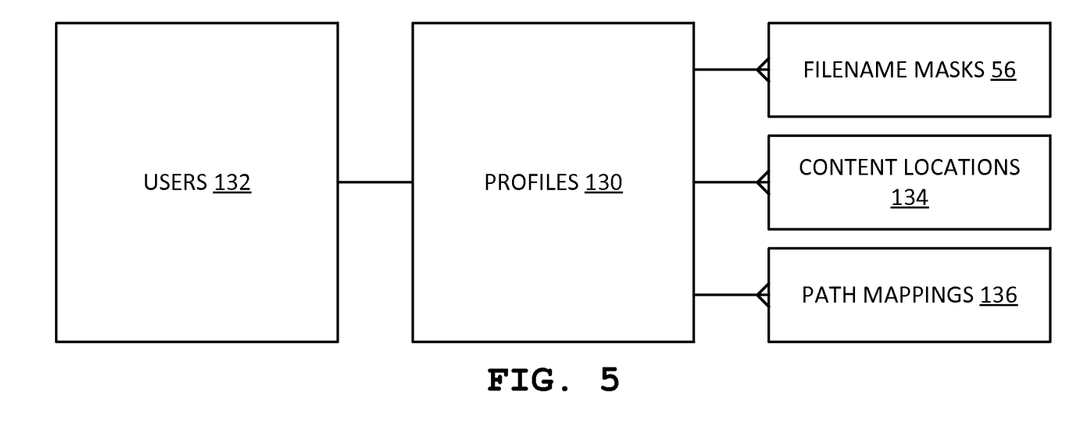
FIG. 5 is a diagram of user profiles.

FIG. 5 shows an example relationship between users, profiles, filename masks, and other information.

A plurality of user profiles 130 can be established for the remote content management system 40. User accounts 132 can be associated with the profiles 130, such that each user is assigned at least one profile 130. Each profile can be associated with a unique set of filename masks 56. Each profile may thus be aligned with the specific applications used by the associated users 132. For example a "finance" profile may include filename masks 56 for spreadsheet/accounting/estimating/etc. applications 32 used by members of a finance department of a company, whereas an "engineering" profile may include filename masks 56 for design/CAD/FEA/project management/etc. applications 32 used by members of a finance department of a company. Moreover, the profiles 130 can define permissions, groups, and other characteristics of the users 132.

Each profile 130 may also specify locations 134 of remote content management systems 40 on the network 16. This may include specifying Internet Protocol (IP) addresses, hostnames, and similar. The content management system interface 28 then references the profile to connect to the appropriate remote content management system 40.

Each profile 130 may also specify path mappings 136 for the content management system interface 28 to effect between the remote content management system 40 and the file manager 20. Path mappings 136, as discussed above, can associate a local drive letter or mount point to a remote path.

Path mappings 136 may be configured to have an arbitrary root for use at the file manager 20. That is, a remote path may have several levels of directories, while a particular profile 130 may only need to function at several levels deep within a directory structure. Hence, the remote path may be truncated and the truncated path may act as a local alias for addressing the remote path. This can be specified in the path mappings 136, and may advantageously avoid a maximum path length limitation at the file manager 20 and/or the OS of the computer 12.

A truncated path can be configured contain a portion of the remote path so as to provide useful information to the user without cluttering the file manager 20 or violating a maximum path length. For example, if the remote path of "company/department/host/team/projects/" is to be provided to a group of users, then a suitable path mapping 136 may map the remote path to local directory "H:/projects". As it is expected that all such users are aware of their own team, this mapping permits access to the projects directory and its subdirectories, while eliminating from the local directory the superfluous path information of "company/department/host/team/". In addition, this mapping permits navigation to and creation of deeper subdirectories with less risk of violating a maximum path length, if any.

The profiles 130 and associated sets of filename masks 56 may be stored in one or more configuration files at one or more of the servers 14, 18. Such a configuration file may be transmitted to the user computer device 12 upon login and authentication of a user via their account 132.

Figure 6:
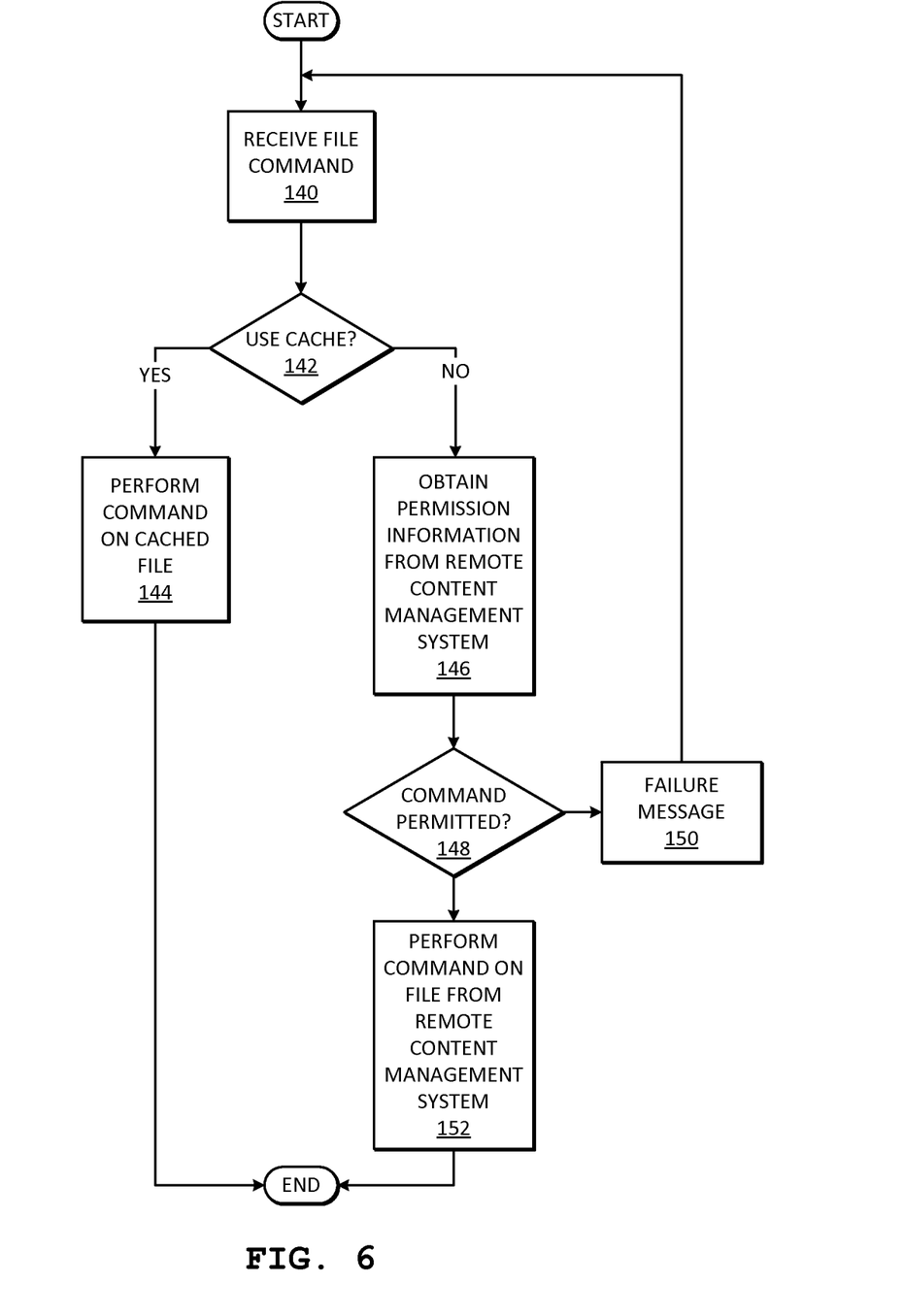
FIG. 6 is a flowchart of a permission check for file access.

FIG. 6 shows a process of a user computer device performing a user file command with reference to a permission. The process is described in terms of the system of FIG. 1, but this is not to be taken as limiting. The process can be used with other systems. In addition, although a procedure of discrete steps is discussed, this is for illustrative purposes. The process may be implemented as a procedure of fewer or more steps, as an object-oriented program, or according to other methodologies.

At step 140, a user file command is received. The user file command may be any of the commands discussed herein, such as a command to open, save, or delete a file. The file manager 20 may receive a command from an application 32 or from a file manager GUI 30.

At step 142 it is determined whether a cached version of the file is to be used. This determination can be made as discussed elsewhere herein with, for example, reference to cache aging and filename masks.

Based on the determination, the command is performed on the cached file, at step 144. When determining to use the cached version of the file, a permission check need not be performed. It may be assumed that the user retains the same permissions as when the file was last obtained from the remote content management system 40.

If the command is to be performed on the file at the remote content management system 40, then the method obtains the relevant permission information associated with the file from remote content management system 40, at step 146. For example, the command may indicate that a file is to be deleted. Step 146 determines whether the file, as stored at the remote content management system 40, is permitted to be deleted and by what user(s) it may be deleted.

At step 148, the permission information is received at the computer device 12 and compared to the user identity that made the command. If the user of the computer device 12 is not permitted to perform the command, then the command is blocked and a failure message is communicated to the file manager 20 for output to the user, at step 150. The process may then await another command.

Permission verification can be delegated to the content management system API 43 by the content management system interface 28. Permission violations can be reported back to the file manager 20 via remote-storage file system driver 26 callback commands. The file manager GUI 30 can be configured to evaluate permission violations and selectably report such to the user. The content management system interface 28 may be configured to provide additional system try notifications to the user computer 12 in the event of permission violations.

If the command does not violate a permission, then the command is performed on the file as obtained from the remote content management system 40. This may include performing one or more of the processes of FIGS. 3 and 4, depending on the type of command received at step 140. That is, if the command is to save a file, then temporary files may be saved in cache, via step 144, while permission to save the resulting master file is not checked until the master file is ready to be saved. If it is then permitted to save the master file, as determined at step 148, then the master file is saved to the remote content management system. 40.

Commands may be to perform actions on files, such as save, delete, etc., and may further be to obtain information about files or directories. The process shown in FIG. 6 applies to any command that requests information about a file or directory or that performs an action on a file or directory. For instance, files and directories may only be visible or readable to users with specific permission, and the process acts to prevent unpermitted users from obtaining file information or directory listings in such cases.

Figure 7:
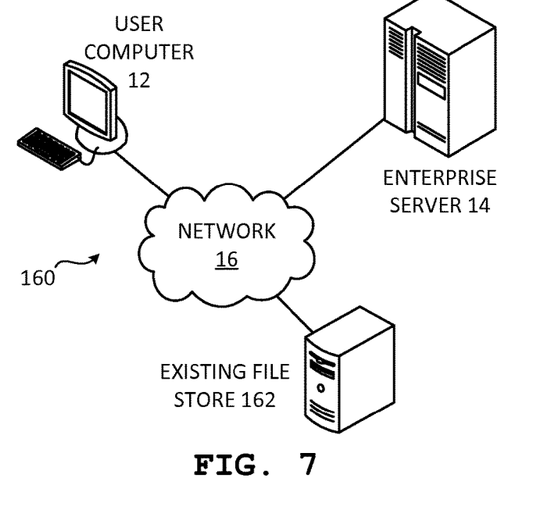
FIG. 7 is a diagram of another networked computer system.

With reference to FIG. 7, a system 160 according to the present invention can be used to migrate files from an existing file store, such as a shared drive, a local drive, an existing enterprise content management system, or other file repository, to a content management system. The system 160 is similar to the system 10 and can operate according to the processes discussed herein. Like components are indicated with like reference numerals, and only differences are discussed in detail.

One or more network existing file stores 162 may be used by a plurality of user computer devices 12 to store files. At some point in time, the file store 162 may fail to meet an organization's file storage needs. Such a failure may be due to a lack of functionality at the file store 162, such as a lack of versioning capability, document retention capability, metadata availability, or other shortcoming of existing file stores. Hence, the organization may decide to migrate to a document management system provided by an enterprise server 14.

File migration can be a time consuming and arduous process and errors may result. To improve migration, the content management system interface 28 of each computer device 12 can be configured to migrate files on an as-needed basis, resulting in a progressive and potentially seamless migration over a time period that need not be limited.

Figure 8:
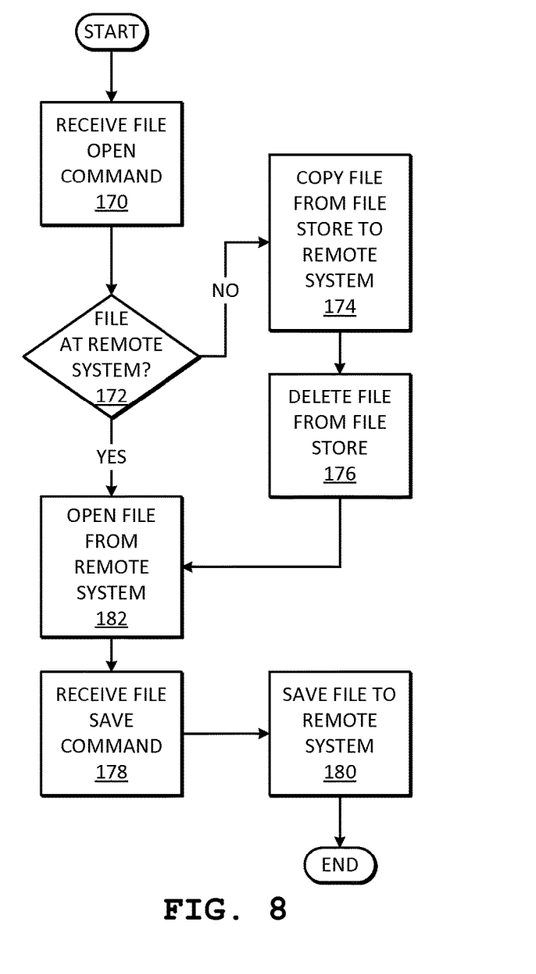
FIG. 8 is a flowchart showing file migration.

FIG. 8 shows a process of progressive migration of files. The process is described in terms of the system of FIG. 7, but this is not to be taken as limiting. The process can be used with other systems. In addition, although a procedure of discrete steps is discussed, this is for illustrative purposes. The process may be implemented as a procedure of fewer or more steps, as an object-oriented program, or according to other methodologies.

The user of the computer device 12 navigates using the file manager 20. Before the enterprise system 14 is provided, such navigation occurs on the existing file store 162. After the enterprise system 14 and its content management system 40 are provided, initial navigation also occurs on the file store 162.

A file open command or similar file access command is received, at step 170. This is the result of the user selecting a file via the file manager 20.

At step 172, it is determined whether the file is stored at the existing file store 162. Initially, all such files are stored at the file store 162. However, as the migration progresses, fewer files remain on the file store 162. The content management system interface 28 is configured to check both sources when opening files or performing similar commands. The content management system interface 28 can be configured to favor the content as found in the content management system 40 over the file store 162. Thus, if the same file is present at both locations, the process ensures that the migrated version is accessed, at step 182, from the content management system 40.

When a file is determined to be at the file store 162, at step 174, the file is immediately copied to the content management system 40 on behalf of the current user 12, at step 174. After being copied, the file is deleted from the file store 162, at step 176. Steps 174, 176 form the migration of the specific file, as triggered by the file being opened or similarly accessed. Subsequent access to the file is from the content management system 40, at step 182.

If the file is subsequently to be saved, then the file is saved to the content management system 40, at step 180, in response to, for example, a file save command received at step 178. The content management system interface 28 is configured to save files only to the content management system 40.

At step 172, it may be determined that previously migrated files are present at the content management system 40. Thus, such files are opened or otherwise accessed via the content management system 40, at step 182. After editing or modification, such files are saved, at steps 178 and 180, to the content management system 40.

During the progressive migration, the process tends to shift from steps 174 and 176 to step 182, until a substantial amount of, or all of, the files are migrated from the one or more file stores 162 to the content management system 40 of the enterprise server 14. Any files that are not migrated by this process can be migrated, archived, or deleted using known techniques.

Figure 9:
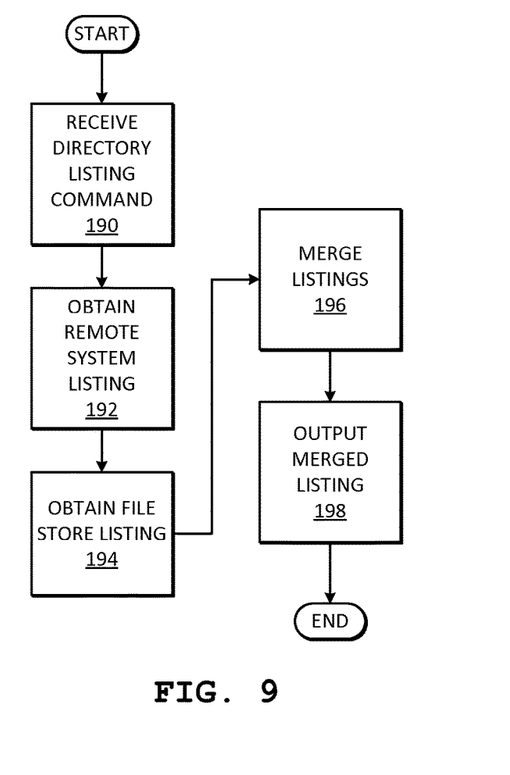
FIG. 9 is a flowchart showing directory merging.

FIG. 9 shows a process of obtaining a directory listing during a progressive migration. The process is described in terms of the system of FIG. 7, but this is not to be taken as limiting. The process can be used with other systems. In addition, although a procedure of discrete steps is discussed, this is for illustrative purposes. The process may be implemented as a procedure of fewer or more steps, as an object-oriented program, or according to other methodologies.

At step 190, a user command to obtain a directory listing is received. Such a command may be made via the file manager 20, such as through a file manager GUI. The content management system interface 28 can be configured to request a directory listing from both of the remote content management system 40 and the file store 162 during a migration.

At step 192, the directory listing at the remote content management system 40 is obtained. Such a listing contains files already migrated to the remote content management system 40 and any new files created at the remote content management system 40.

At step 194, the directory listing at the file store 162 is obtained. Such a listing contains files not yet migrated to the remote content management system 40.

Next, at step 196, the directory listings from the remote content management system 40 and the file store 162 are merged into a single merged directory listing. The content management system interface 28, specifically the control logic 54, can be configured to perform the merge. The merged directory listing may contain an indication of the location of each file, but this is not necessary.

Lastly, at step 198, the merged directory listing is output. The merged directory listing can be displayed at the GUI 30 of the file manager or provided to an application.

Numerous advantages of the present invention should be apparent from the above. In addition to a familiar an intuitive interface being provided for remote content management system, network traffic can be reduced by the handling of temporary files. Migration from legacy storage to modern content management systems is also facilitated in a transparent and efficient manner. Other advantages should also be apparent to those skilled in the art.

While the foregoing provides certain non-limiting example embodiments, it should be understood that combinations, subsets, and variations of the foregoing are contemplated. The monopoly sought is defined by the claims.

What is claimed is:

1. A computer device for interfacing with, and smooth migration from a legacy storage to, a remote content management system, the computer device comprising:
   a memory;
   a network interface; and
   a processor coupled with the memory and the network interface, the processor configured by a set of executable instructions to operate:
   a file manager stored in the memory, the file manager comprising a graphic user interface and an application program interface (API) for receiving a plurality of user file commands from at least one application executed by the processor and outputting user file information;
   a content management system interface stored in the memory, the content management system interface comprising control logic and configured to receive the plurality of user file commands from the file manager and translate the plurality of user file commands into content management commands for sending to the remote content management system via the network interface, the content management system interface further configured to receive remote file information from the remote content management system via the network interface and translate the remote file information into the user file information for the file manager;
   wherein the content management system interface is configured to:
   copy a file from an existing file store to the remote content management system upon receiving a user file command from the plurality of user file commands to access the file and upon determining that the file is not already present at the remote content management system;
   migrate the file on an as-needed basis, wherein a progressive and seamless migration is provided over a time period;
   control a local/shared drive, wherein the content management system interface appears substantially identical to the local/shared drive,
   wherein the control logic is configured to: apply at least one filename mask, evaluate at least one file permission for restricting access to at least one file, modify at least one file attribute, modify metadata, control operation of the content management system interface, and map at least one remote path located at the remote content management system,
   wherein the metadata comprises at least one information element of author information, creation date information, modification date information, tag information, and file-size information,
   wherein the permissions associate at least one of a user identity and a group identity to at least one of a specific permitted command and a specific restricted command for at least one specific file,
   wherein the content management system interface comprises an authentication component configured to prompt a user to provide credentials for access to the content management system interface and the remote content management system, and
   wherein authentication by the authentication component is implemented as at least one of a username and password combination, a certificate, and a query of at least one of an enterprise server and a support server.

2. The device of claim 1, further comprising a file system driver stored in the memory and executable by the processor, the file system driver coupled to the file manager and coupled to the content management system interface, the file system driver configured to receive the plurality of user file commands from the file manager and output the user file information to the file manager, the content management system interface configured to receive the plurality of user file commands from the file system driver and to provide the user file information to the file system driver.

3. The device of claim 1, further comprising a file system driver stored in the memory and executable by the processor, the file system driver coupled to the file manager and coupled to the content management system interface, the file system driver mapping the content management system interface as a local drive for access by the file manager.

4. The device of claim 1, wherein the file manager is configured to provide the graphical user interface for navigating and manipulating a hierarchy of folders and files.

5. The device of claim 1, wherein the content management system interface comprises a cache of one or more temporary files, the content management system interface configured to output a master file based on the one or more temporary files to the remote content management system upon receiving the user file command from the plurality of user file commands, the content management system interface configured to not output to the remote content management system any of the one or more temporary files associated with the master file.

6. The device of claim 5, wherein the cache is encrypted and the content management system interface is configured to authenticate the user for decrypting the cache.

7. The device of claim 5, wherein the content management system interface is configured to reference filename masks to differentiate temporary files from master files.

8. The device of claim 7, wherein each individual user profile of a plurality of user profiles for the remote content management system is associated with a unique set of filename masks.

9. The device of claim 1, wherein the content management system interface is configured to block the user file command from the plurality of user file commands received from the file manager for a particular file when the user file command from the plurality of user file commands violates a permission set at the remote content management system.

10. The device of claim 1, wherein the content management system interface is configured to block delivery of remote file information to the file manager when delivery of the remote file information violates a permission set on the remote content management system.

11. The device of claim 1, wherein the content management system interface is configured to: map a path, on the remote content management system, to a truncated path containing a portion of the path, and provide the truncated path to the file manager as an alias for addressing the path.

12. The device of claim 1, wherein the content management system interface is further configured to delete the file from the existing file store in response to receiving the user file command from the plurality of user file commands to access the file and after the file has been copied to the remote content management system, wherein deleting the file completes a migration of the file from the existing file store to the remote content management system.

13. The device of claim 1,
wherein the remote content management system is configured to migrate the file from an existing file store,
wherein the content management system interface is configured to check the existing file store and the remote content management system when opening the file,
wherein the content management system interface is configured to request a directory listing from the remote content management system and the existing file store during a migration,
wherein the content management system interface is configured to favor content in the remote content management system over content in the existing file store, wherein when a same file is present in both the content management system and the existing file store, a migrated version of the same file is accessed from the remote content management system,
wherein the remote content management system is configured to expose the API to the content management system interface to exchange at least one of commands, content, and other information,
wherein the remote content management system stores directory structures containing files in at least one form of file content, attributes, metadata, and permissions,
wherein the file content comprises at least one of information in at least one file format of .docx, .txt, and .dxf and executable instructions,
wherein the attributes comprise at least one setting of a hidden setting and a read-only setting, and
wherein the remote content management system further comprises a web presentation module configured to output at least one web page for accessing and modifying at least one of the directory structures, the file content, the attributes, the metadata, and the permissions.

14. The device of claim 13,
wherein the control logic is further configured to map remote paths located at the remote content management system to local paths presentable at the file manager, whereby path mappings are provided, and whereby a file is selectable via the final manager, and whereby at least one of file information and the file content are deliverable from the remote content management system,
wherein the path mappings are configured to have an arbitrary root for use at the file manager,
wherein a remote path has a directory structure comprising a plurality of directory levels, and
wherein a particular profile functions in at least some directory levels deep within the plurality of directory levels, whereby the remote path is truncated and acts as a local alias for addressing, and whereby the local alias is specified in the path mappings, and whereby a maximum path length limitation for at least one of the file manager and an operating system of the computer device is avoided.

15. The device of claim 13,
wherein the content management system interface comprises filename masks that discriminate between files that are to remain local in relation to the computer device and files that are to be transferred to the remote content management system, and
wherein temporary files remain local while master files, based on the temporary files, are sent to the remote content management system,
wherein transmission of temporary files to the remote content management system is prevented.

16. The device of claim 13, wherein the content management system interface comprises a cache of temporary files, the cache of temporarily files comprising at least one of working versions of files undergoing editing at the computer device and temporary files generated during a save operation of the API.

17. The device of claim 16,
wherein the content management system interface comprises an encryption engine configured to encrypt at least one of the cache, filename masks, and any other information component, the encryption engine controlled by the authentication component, the encryption engine conforming to at least an Advanced Encryption Standard (AES),
wherein one of a log-out and a time out triggers encryption of the cache, and
wherein successful authentication triggers decryption of the cache.

* * * * *